United States Patent
Cho et al.

(10) Patent No.: US 10,754,601 B2
(45) Date of Patent: Aug. 25, 2020

(54) PRINTING THROUGH AUTOMATIC SORTING

(71) Applicant: HP PRINTING KOREA CO., LTD., Suwon-si, Gyeonggi-do (KR)

(72) Inventors: Soo Young Cho, Suwon-si (KR); Se Young Kim, Suwon-si (KR); Eun Kyung Yun, Suwon-si (KR); Pyung Hwa Lee, Suwon-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/491,687

(22) PCT Filed: Feb. 13, 2018

(86) PCT No.: PCT/KR2018/001877
§ 371 (c)(1),
(2) Date: Sep. 6, 2019

(87) PCT Pub. No.: WO2018/169219
PCT Pub. Date: Sep. 20, 2018

(65) Prior Publication Data
US 2020/0183630 A1 Jun. 11, 2020

(30) Foreign Application Priority Data
Mar. 17, 2017 (KR) .......................... 10-2017-0033869

(51) Int. Cl.
*G06F 3/12* (2006.01)
(52) U.S. Cl.
CPC .......... *G06F 3/1262* (2013.01); *G06F 3/1204* (2013.01); *G06F 3/1267* (2013.01); *G06F 3/1285* (2013.01)

(58) Field of Classification Search
CPC .... G06F 3/1262; G06F 3/1204; G06F 3/1267; G06F 3/1285
USPC .......................................... 358/1.1–1.18, 402
See application file for complete search history.

(56) References Cited

U.S. PATENT DOCUMENTS

| 7,804,607 | B2* | 9/2010 | Tomita | G06F 3/1204 |
| | | | | 358/1.12 |
| 8,995,001 | B1 | 3/2015 | Koets | |
| 2005/0195434 | A1* | 9/2005 | Ohara | G06F 3/1267 |
| | | | | 358/1.16 |
| 2008/0266594 | A1* | 10/2008 | Lankreijer | G06F 3/1211 |
| | | | | 358/1.15 |

(Continued)

FOREIGN PATENT DOCUMENTS

| JP | 2005-216103 A | 8/2005 |
| KR | 10-2015-0117190 A | 10/2015 |
| KR | 10-2016-0066076 A | 6/2016 |

*Primary Examiner* — Gabriel I Garcia
(74) *Attorney, Agent, or Firm* — Jefferson IP Law, LLP

(57) ABSTRACT

An image forming apparatus for printing through automatic sorting is described. A communication interface obtains data from a plurality of external apparatuses. A processor, in response to the obtaining, collects the obtained data according to a plurality of groups sorted based on identification information included in the obtained data, and generates a print command when a predetermined condition is satisfied. An image forming job performer prints data collected in the plurality of groups according to the generated print command.

16 Claims, 7 Drawing Sheets

(56) References Cited

U.S. PATENT DOCUMENTS

2011/0267658 A1\* 11/2011 Maeshima ......... H04N 1/00506
358/448
2013/0012802 A1 1/2013 Horseman
2014/0085652 A1 3/2014 Yoshida et al.

\* cited by examiner

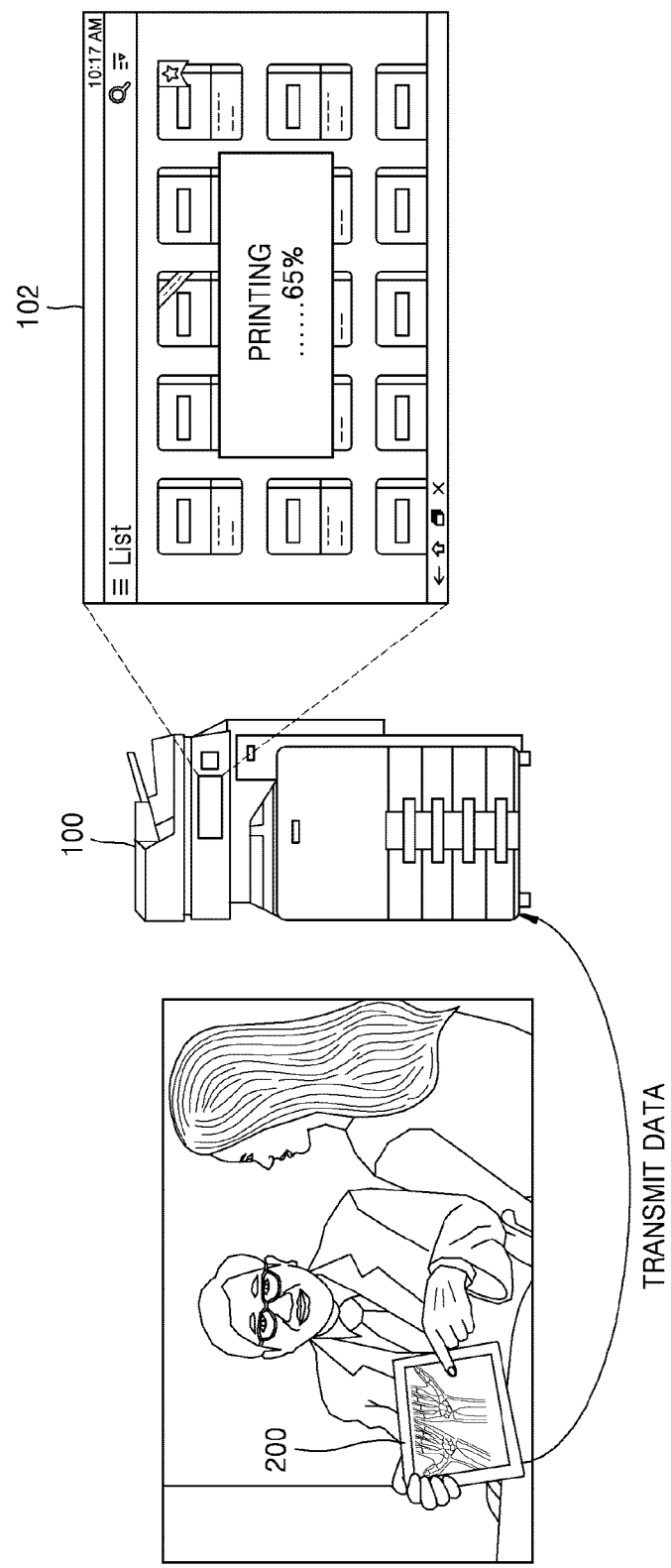
[Fig. 1]

[Fig. 2]
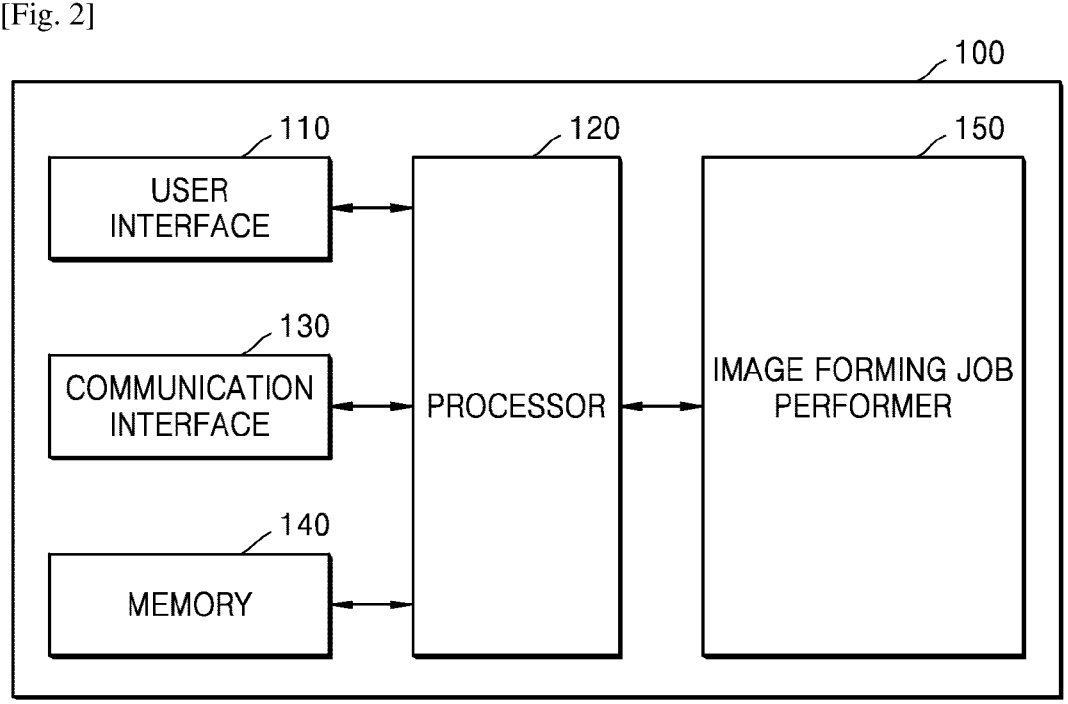

[Fig. 3]
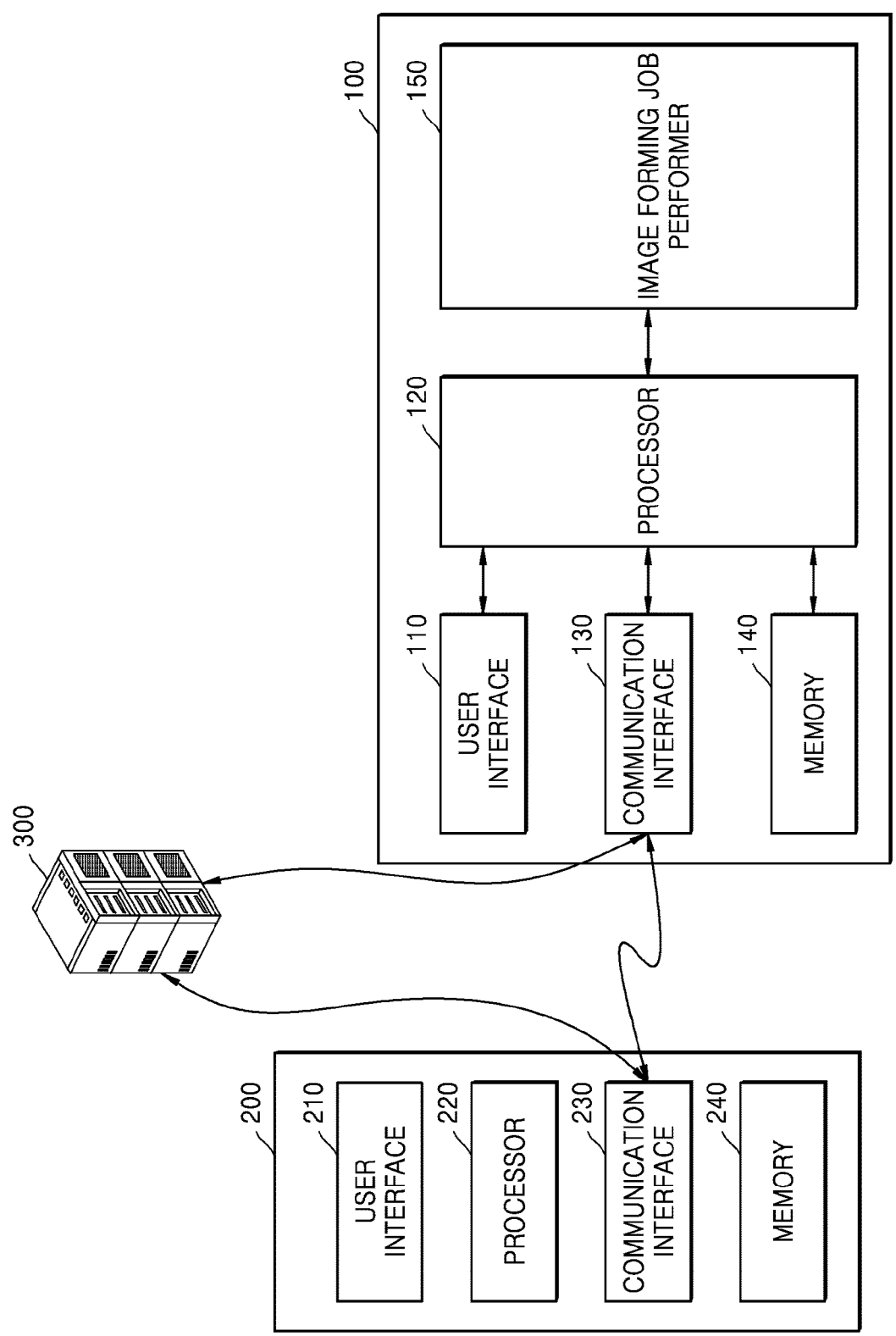

[Fig. 4]
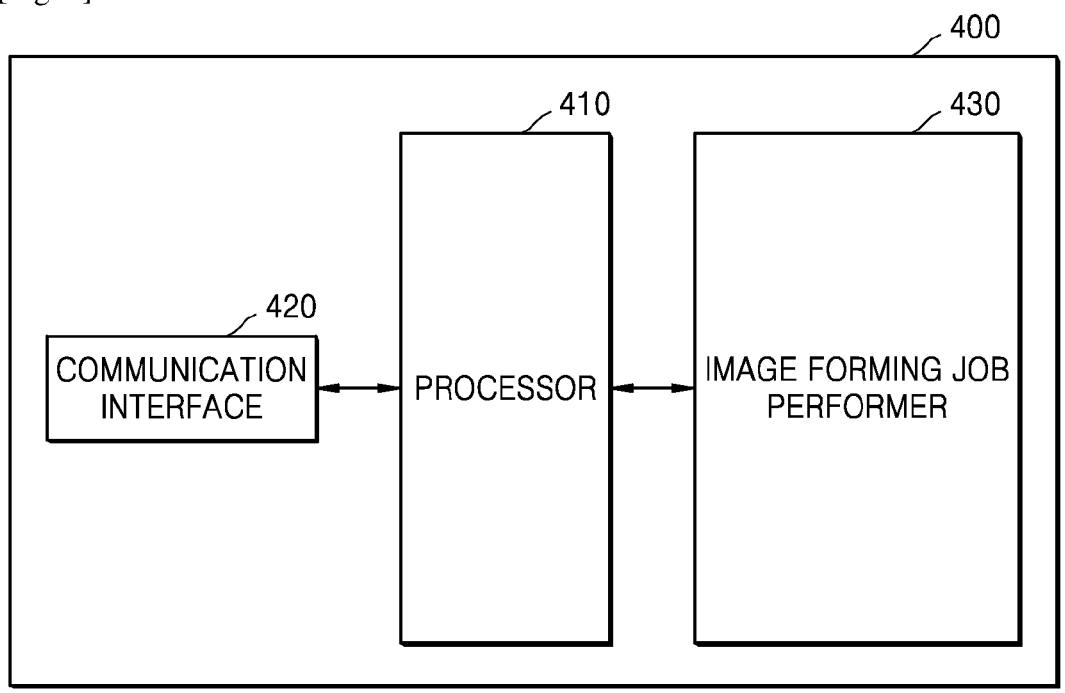
[Fig. 5]
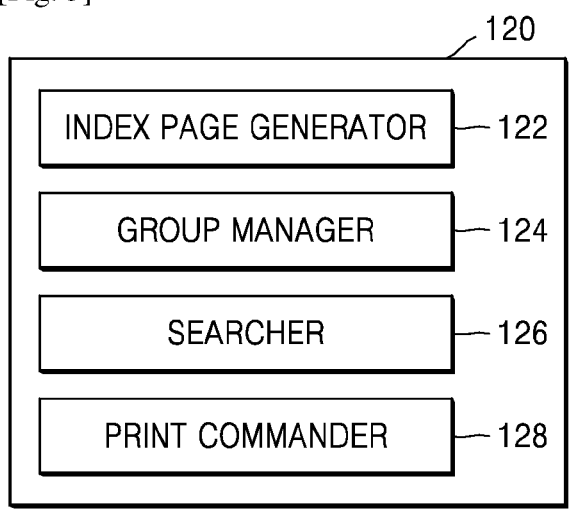

[Fig. 6]
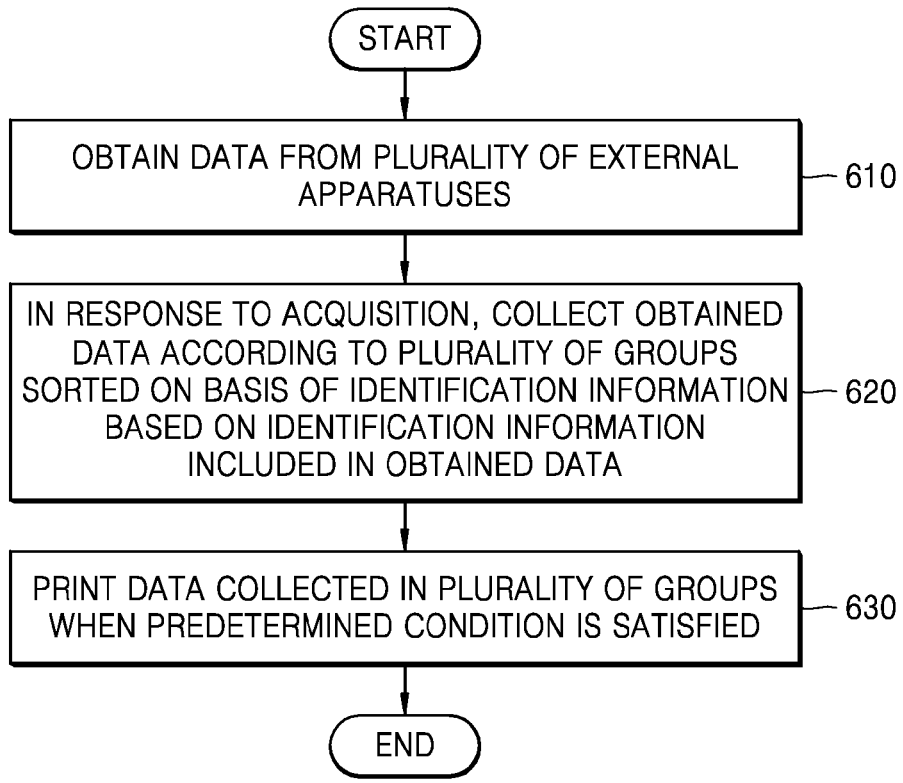
[Fig. 7]
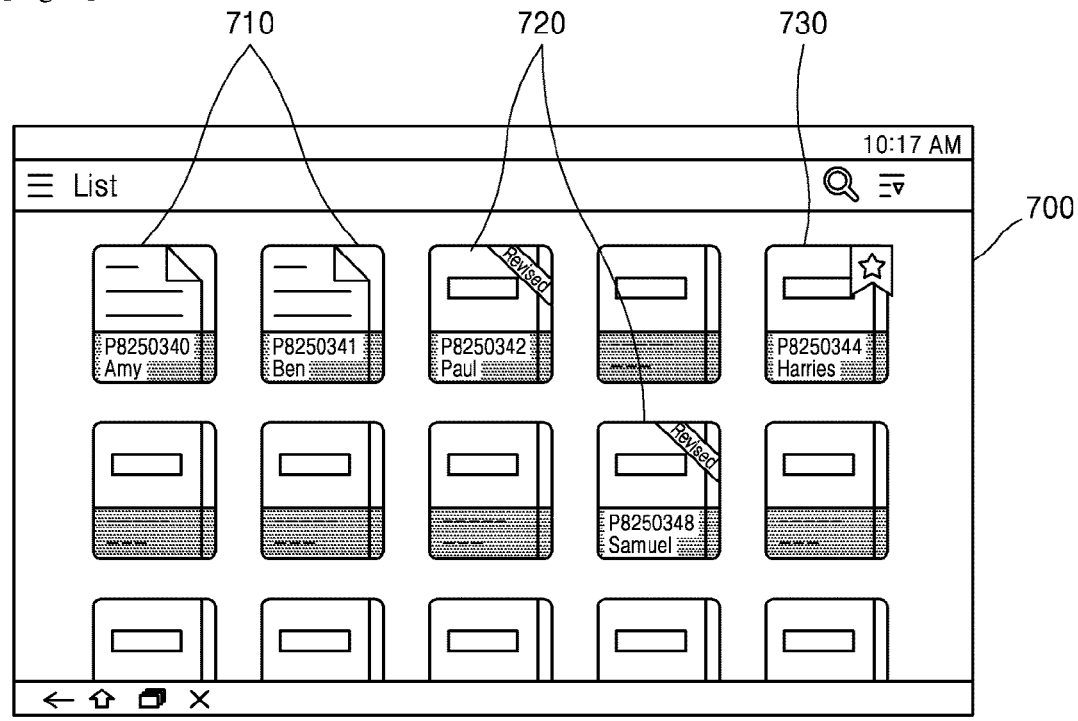

[Fig. 8A]
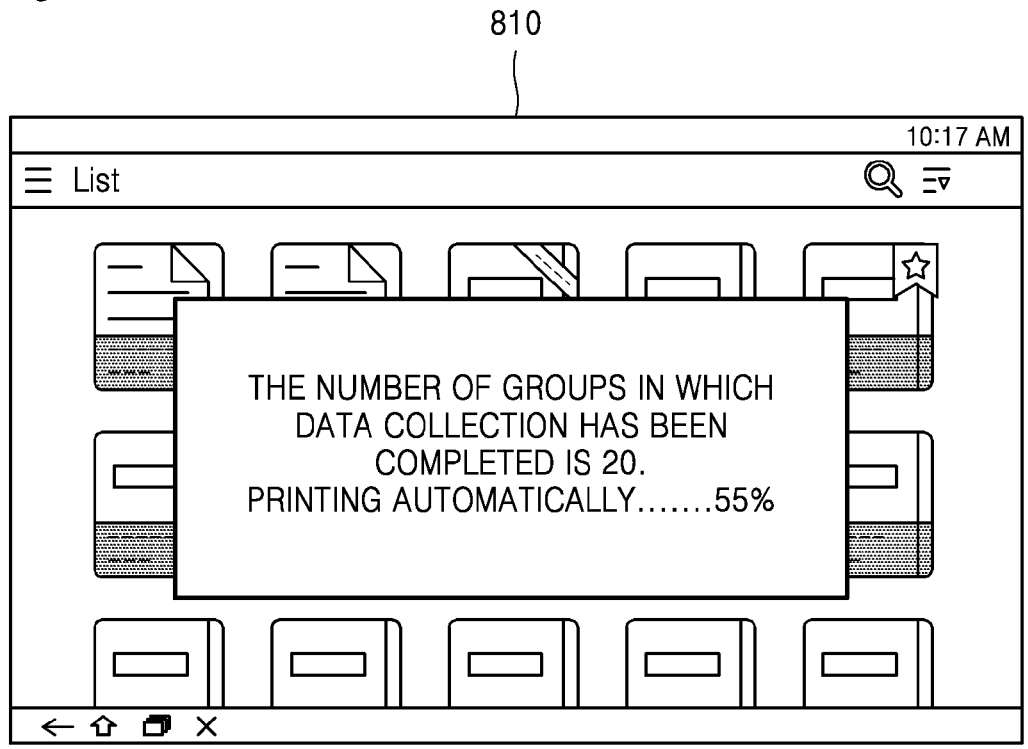
[Fig. 8B]
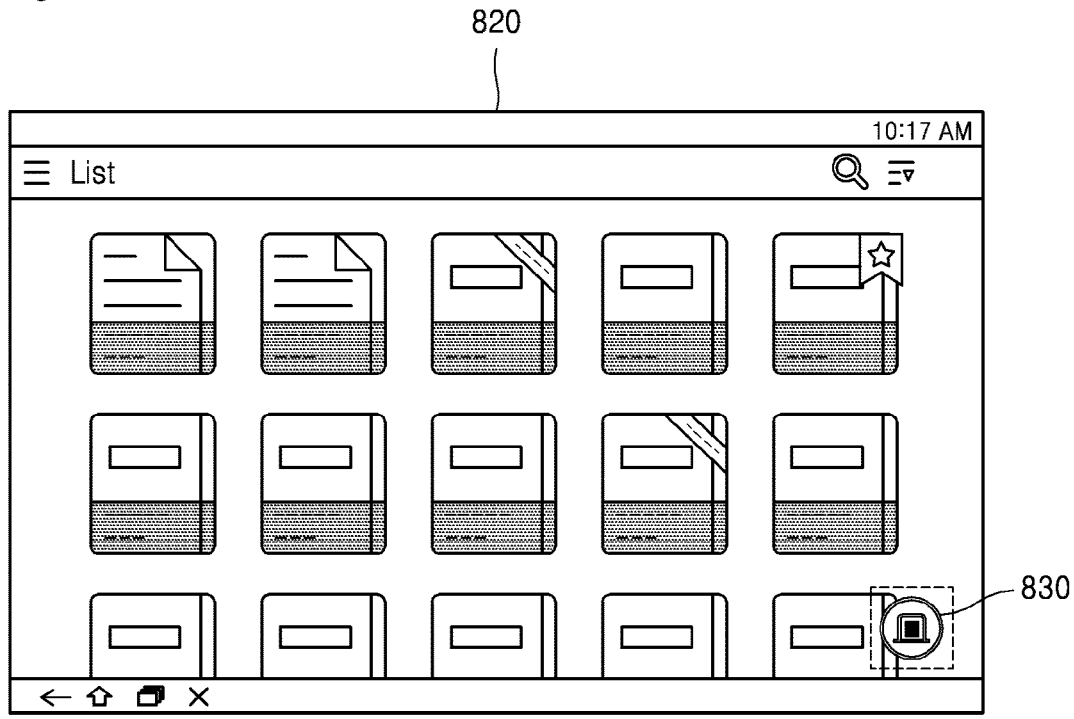

[Fig. 9]
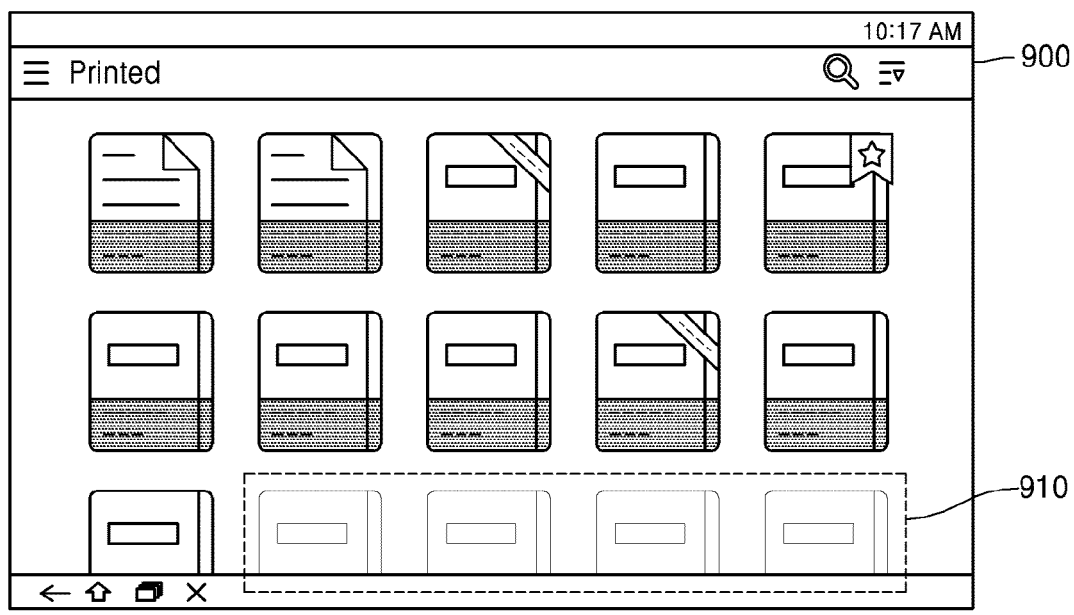
[Fig. 10]
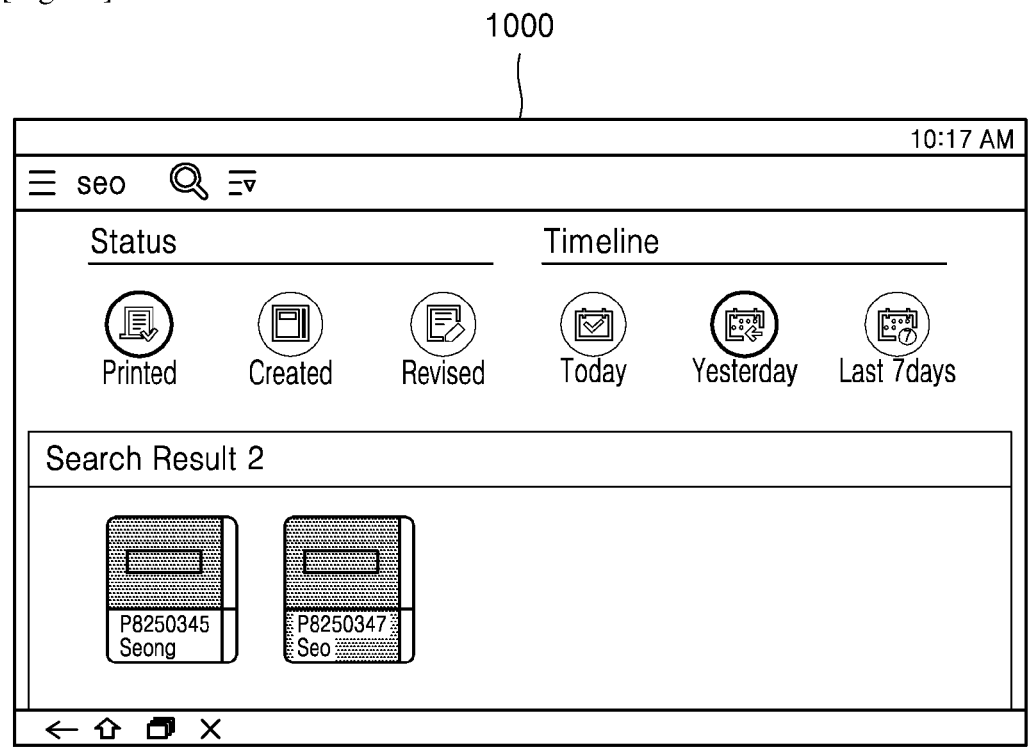

PRINTING THROUGH AUTOMATIC SORTING

BACKGROUND ART

In a conventional medical testing center, a plurality of test results of a large number of examinees are irregularly collected by a manager, and the manager performs a process of sorting the collected test results of each examinee and inspecting whether there are any missing documents.

DISCLOSURE OF INVENTION

Brief Description of Drawings

Various aspects will become apparent and more readily appreciated from the following description of examples, taken in conjunction with the accompanying drawings in which:

FIG. 1 illustrates a process in which an image forming apparatus obtains data and prints out the obtained data according to an example;

FIG. 2 is a block diagram of an image forming apparatus according to an example;

FIG. 3 is a block diagram illustrating a relationship between an image forming apparatus, an external apparatus, and a server, according to an example;

FIG. 4 is a block diagram of an image forming apparatus according to another example;

FIG. 5 is a block diagram of a processor according to an example;

FIG. 6 is a flowchart of a method of operating an image forming apparatus according to an example;

FIG. 7 is a view of a user interface screen according to an example;

FIGS. 8A and 8B are views of a case in which a predetermined condition, according to an example, is satisfied;

FIG. 9 is a view of a user interface screen according to another example; and

FIG. 10 is a view of a process of searching for groups in an image forming apparatus according to an example.

MODE FOR THE INVENTION

Reference will now be made to examples that are illustrated in the accompanying drawings. In this regard, the examples may have different forms and should not be construed as being limited to the descriptions set forth herein. In order to further clearly describe features of the examples, descriptions of other features that are well known to one of ordinary skill in the art are omitted here.

Throughout the specification, repeated descriptions thereof are omitted for convenience.

In the specification, when an element is "connected" to another element, the elements may not only be "directly connected," but may also be "electrically connected" via another element therebetween. Also, when a region "includes" an element, the region may further include another element instead of excluding the other element, unless otherwise differently stated.

In the following description, an "image forming job" may denote any one of various jobs (for example, printing, copying, scanning, and faxing) related to an image, such as forming of an image or generating/storing/transmitting of an image file, and a "job" may denote not only an image forming job, but may also denote a series of processes required to perform the image forming job.

Also, an "image forming apparatus" may denote any apparatus capable of performing an image forming job, such as a printer, a scanner, a fax machine, a multi-function printer (MFP), or a display apparatus.

Also, "print data" may denote data having a format printable by a printer.

Also, a "scan file" may denote a file generated by scanning an image by using a scanner.

Also, a "user" may denote a person who performs a manipulation related to an image forming job by using an image forming apparatus or a device connected to the image forming apparatus wirelessly or via wires.

Hereinafter, examples of the present disclosure will be described with reference to the accompanying drawings.

FIG. 1 illustrates a process in which an image forming apparatus obtains data and prints out the obtained data according to an example.

Referring to FIG. 1, an image forming apparatus 100 may obtain at least one piece of data from at least one external apparatus 200. The at least one external apparatus 200 may include a server, a personal computer (PC), a tablet PC, a medical device, a household appliance, a wearable device, and a smart phone, but is not limited thereto.

As illustrated in FIG. 1, the at least one external apparatus 200 may include a medical device or a Hospital Information System (HIS). The image forming apparatus 100 may be used for collecting and printing data related to medical records of patients who have been treated in the hospital, wherein such collecting and printing of data may be performed automatically or upon selection of a user. Of course, fields in which the image forming apparatus 100 is utilized are not limited thereto. The image forming apparatus 100 may be utilized for various purposes in various fields such as when an educational institution collects and prints training data, when a company collects and prints data of applicants while employing a new employee, and the like.

The image forming apparatus 100 may collect data obtained from a plurality of external apparatuses 200 according to a plurality of groups sorted based on identification information, and may print the data collected in the plurality of groups in a group unit when a predetermined condition is satisfied. Furthermore, the image forming apparatus 100 may display a user interface 102 to convey information or request and/or receive input from a user. Descriptions of examples of the predetermined condition and user interface will be described below with reference to FIGS. 8A and 8B.

In the present disclosure, the term "identification information" may refer to information used when distinguishing each data obtained from the outside. For example, the identification information may be a name, a resident registration number, a medical ID in a hospital of an examinee, and the like.

In the present disclosure, the term "group" may refer to a set of data having identical identification information from among pieces of data obtained from the outside. For example, an internal medicine medical record and an orthopedic medical record of an examinee named "Cheol-su" may constitute one group in the image forming apparatus 100. In another example, a college transcript and an official language certificate of an interviewee named "Mike" may constitute a group in the image forming apparatus 100.

The image forming apparatus 100 may collect pieces of data obtained from the outside according to a plurality of groups sorted based on identification information, and may automatically print the data collected in the plurality of groups for each group when a predetermined condition is satisfied. Accordingly, when the image forming apparatus 100 is used, convenience and accuracy may be improved compared to a conventional method of manually sorting and inspecting printouts of medical data of examinees at hospitals.

FIG. 2 is a block diagram of an image forming apparatus according to an example.

Referring to FIG. 2, the image forming apparatus 100 may include a user interface 110, a processor 120, a communication interface 130, a memory 140, and an image forming job performer 150. Also, although not illustrated in FIG. 2, the image forming apparatus 100 may further include other components such as a power supplier for supplying power to each component of the image forming apparatus 100.

The user interface 110 may include an input unit for receiving, from a user, an input for performing an image forming job, and an output unit for displaying information, such as a result of performing an image forming job or a status of the image forming apparatus 100. For example, the user interface 110 may include an operation panel for receiving a user input and a display panel for displaying a screen.

As an example, the input unit may include at least one of devices for receiving various types of user inputs, such as a keyboard, a physical button, a touch screen, a camera, and a microphone. Also, the output unit may include, for example, a display panel or a speaker. However, the disclosure is not limited thereto, and the user interface 110 may include at least one device supporting various inputs and outputs.

In an example, the user interface 110 may display an icon representing each of a plurality of groups on a user interface screen.

The processor 120 controls overall operations of the image forming apparatus 100, and may include a processor, such as a central processing unit (CPU). The processor 120 may control other components included in the image forming apparatus 100 such that an operation corresponding to a user input received through the user interface 110 is performed.

For example, the processor 120 may execute a program stored in the memory 140, read a file stored in the memory 140, store a new file in the memory 140, and the like.

In an example, the processor 120, in response to acquisition of data from the outside, may allocate data to any one of a plurality of groups sorted according to identification information based on the identification information included in data obtained from the outside. In other words, the processor 120 may control the plurality of groups to collect the data obtained from the outside based on the identification information.

In addition, the processor 120 may generate a print command when a predetermined condition is satisfied.

The communication interface 130 may communicate with another device or a network in a wired or wireless manner. Accordingly, the communication interface 130 may include a communication module supporting at least one of various wired and wireless communication methods. For example, the communication module may be in a form of a chipset or may be a sticker or a bar code (for example, a sticker including a near field communication (NFC) tag) including information required for communication.

Wireless communication may include, for example, at least one of wireless fidelity (Wi-Fi), Wi-Fi direct, Bluetooth, ultra wideband (UWB), NFC, and the like. Wired communication may include, for example, at least one of universal serial bus (universal serial bus), high definition multimedia interface (HDMI), and the like.

The communication interface 130 may be connected to an external apparatus 200 provided outside the image forming apparatus 100 to transmit and receive a signal or data to and from the external apparatus 200. For example, the image forming apparatus 100 may be connected to the external apparatus 200 through the communication interface 130. The communication interface 130 may transmit a signal or data received from the external apparatus 200 to the processor 120, or transmit a signal or data generated by the processor 120 to the external apparatus 200. For example, when the communication interface 130 receives a print command signal or print data from the external apparatus 200, the processor 120 may print the print data through the image forming job performer 150.

In an example, the communication interface 130 may obtain at least one piece of data from at least one external apparatus.

Various types of data, such as a file or a program like an application, may be installed and stored in the memory 140. The processor 120 may access the data stored in the memory 140 to use the data, or may store new data in the memory 140. Also, the processor 120 may execute a program installed in the memory 140 and may install an application received from an external source through the communication interface 130 in the memory 140.

In an example, the memory 140 may store information regarding at least one piece of data and a plurality of groups.

The image forming job performer 150 may perform an image forming job, such as printing, scanning, or faxing.

In an example, the image forming job performer 150 may print data allocated to a plurality of groups according to the print command generated by the processor 120.

FIG. 3 is a block diagram illustrating a relationship between an image forming apparatus, an external apparatus, and a server, according to an example.

Referring to FIG. 3, the external apparatus 200 may include a user interface 210, a processor 220, a communication interface 230, and a memory 240. The processor 220 may control an image forming operation by executing a program stored in the memory 240 and transmitting the resulting signal or data to the image forming apparatus 100 via the communication interface 230.

The communication interface 130 may be directly connected to a server 300 to transmit and receive signals or data. Also, the communication interface 130 may be connected to the external apparatus 200 via the server 300. That is, the communication interface 130 of the image forming apparatus 100 may transmit/receive signals or data to/from the communication interface 230 of the external apparatus 200 via the server 300.

FIG. 4 is a block diagram of an image forming apparatus according to another example.

Referring to FIG. 4, the image forming apparatus 400 may include a processor 410, a communication interface 420, and an image forming job performer 430. It should be understood by those of ordinary skill in the art that the processor 410 may perform the same operation as that of the processor 120 of FIG. 2, the communication interface 420 may perform the same operation as that of the communication interface 130 of FIG. 2, and the image forming job performer 430 may perform the same operation as that of the image forming job performer 150 of FIG. 2.

In an example, the communication interface 420 may obtain data from the plurality of external apparatuses 200.

In an example, the processor 410, in response to acquisition of pieces of data from the outside, may collect the obtained pieces of data according to a plurality of groups sorted based on identification information included in the obtained pieces of data.

In an example, the processor 410 may generate a print command when a predetermined condition is satisfied.

In an example, the image forming job performer 430 may print data collected by a plurality of groups according to the print command generated by the processor 410.

FIG. 5 is a block diagram of a processor according to an example.

Referring to FIG. 5, the processor 120 according may include an index page generator 122, a group manager 124, a searcher 126, and a print commander 128.

In the present disclosure, the term "index page" may refer to a representative page of a group that collectively displays pieces of data collected by each group. For example, if "Cheol-su" has a history of applying for orthopedic and internal medicine checkups, and has completed checkups at orthopedics and internal medicine, an index page may simultaneously display the checkup application history and whether results of each checkup are printed out. Therefore, the index page may be used as an inspection result for checking whether there is a test result that is missing printing from among the test results corresponding to the checkup application history.

The index page generator 122 may generate an index page based on data collected by each group. For example, the index page generator 122 may generate an index page of a specific group in response to completion of data collection of the specific group.

The group manager 124 may create a new group if a group corresponding to identification information included in at least one piece of data obtained from the outside by the communication interface 130 does not exist in the memory 140. For example, when "Young-hee" has consulted a doctor in an orthopedics department and an HIS has transmitted data related to "Young-hee" to the image forming apparatus 100 but a group corresponding to "Young-hee" does not exist in the memory 140 of the image forming apparatus 100, the group manager 124 may newly generate a group "Young-hee."

The group manager 124, in response to the obtaining of at least one piece of data from the outside, may collect the obtained data according to a plurality of groups sorted based on identification information included in the obtained data.

The group manager 124 may move the position of each group icon on a user interface screen according to the status of each group. For example, based on whether each group has been printed out, the group manager 124 may arrange and display printed groups from the bottom of the user interface screen and unprinted groups from the top of the user interface screen.

The group manager 124 may delete pieces of data of groups with respect to which a predetermined period of time has elapsed after completion of their printing from the memory 140. A more detailed description related to deleting the pieces of data of groups with respect to which a predetermined period of time has elapsed after completion of their printing will be described below with reference to FIG. 9.

The searcher 126 may search for a specific group from among a plurality of groups. For example, when a user inputs a specific keyword through the user interface 110, the searcher 126 may search for groups having identification information including the specific keyword.

The print commander 128 may generate a command to print data of groups in which data collection has been completed when a predetermined condition is satisfied.

FIG. 6 is a flowchart of a method of operating an image forming apparatus according to an example.

Each operation of the method shown in FIG. 6 may be performed by components of the image forming apparatuses 100 and 400 shown in FIGS. 2 to 5. In FIG. 6, like reference numerals in FIGS. 2 to 5 denote like elements, and repeated descriptions thereof will be omitted.

Referring to FIG. 6, the image forming apparatus 100 may obtain data from the plurality of external apparatuses 200 in operation 610.

In operation 620, the image forming apparatus 100, in response to the obtaining of at least one piece of data from the outside, may collect the obtained data according to a plurality of groups sorted based on identification information included in the obtained data.

In operation 630, the image forming apparatus 100 may print data collected in the plurality of groups when a predetermined condition is satisfied.

In an example, when data collection of a predetermined number or more of groups of the image forming apparatus 100 is completed, the image forming apparatus 100 may print the data of the predetermined number or more of groups.

In an example, when the image forming apparatus 100 obtains a user input from a user to print data of at least one group in which data collection has been completed, the image forming apparatus 100 may print the data of at least one group in which data collection has been completed.

In an example, the image forming job performer 150 of the image forming apparatus 100 may print an index page of each of a plurality of groups.

In an example, operations 610 through 630 may be performed automatically by the processor 120 in the image forming apparatus 100 without user intervention.

FIG. 7 is a view of a user interface screen according to an example.

Referring to FIG. 7, each of a plurality of groups displayed on a user interface screen 700 may be matched with one icon and displayed. The user interface screen 700 displays each group as a binder-shaped icon, but the shape of an icon for displaying each group is not limited thereto.

In an example, a group 710 corresponding to "Amy" and "Ben" shown in the user interface screen 700 may refer to a group in which data allocation has not been completed. For example, if Amy has received an orthopedic checkup but has not yet received the test result, the image forming apparatus 100 may determine that data allocation to a group "Amy" has not yet been completed.

In an example, when data of at least one specific group is changed after data of the specific group is printed, the image forming apparatus 100 may control the at least one group whose data is changed to be distinguished from other groups and displayed on the user interface screen 700. For example, the phrase "Revised" may be displayed together with a binder 720 in FIG. 7.

In more detail, a group 720 corresponding to "Paul" and "Samuel" shown in the user interface screen 700 may refer to a group in which some of data is corrected after the data of the group is printed. For example, all the results of an internal medical check of Samuel came out and data allocation to a group "Samuel" have been completed, and the data and index pages allocated to the group "Samuel" have been printed. Here, when some of the results of Samuel's internal medical check proved to be false (that is, when some of the data allocated to the group "Samuel" needs to be corrected), the image forming apparatus 100 may correct some of the data of the corresponding group.

In an example, a group 730 corresponding to "Harries" shown in the user interface screen 700 may refer to a group that a user specifically wants to manage.

For example, if Harries is a customer who has been in medical care for more than 10 years in a particular hospital, a user of the image forming apparatus 100 may select the group "Harries" as a special management group via the user interface 110.

In another example, the image forming apparatus 100 may determine a group of examinees who have been registered in a hospital for at least 10 years as a special management group without a user input.

FIGS. 8A and 8B are views of a case in which a predetermined condition, according to an example, is satisfied.

Referring to FIG. 8A, a process of determining whether a predetermined condition is satisfied based on the number of groups in which data collection has been completed is illustrated.

In an example, the processor 120 of the image forming apparatus 100 may determine that a predetermined condition is satisfied when data collection of a predetermined number or more of groups is completed. In response to the predetermined condition being satisfied, the processor 120 of the image forming apparatus 100 may generate a print command.

For example, as shown in a user interface 810, the image forming apparatus 100 may print data of 20 groups in which data collection has been completed in response to the completion of data collection of the 20 groups.

In an example, when data of at least one of a predetermined number or more of groups is changed after data of the predetermined number or more of groups has been printed, the image forming apparatus 100 may control the at least one group whose data is changed to be distinguished from other groups and displayed on a user interface screen.

Referring to FIG. 8B, a process of determining whether a predetermined condition is satisfied based on whether or not a user has manually input a print command is illustrated.

When the user interface 110 obtains a user input from a user to print data of at least one group in which data collection has been completed, the processor 120 may determine that a predetermined condition is satisfied. In response to the predetermined condition being satisfied, the processor 120 of the image forming apparatus 100 may generate a print command.

For example, as shown in a user interface 820, a user may instruct the image forming apparatus 100 to print data of at least one group in which data collection has been completed by pressing a print button 830 shown in a user interface screen 820. The image forming apparatus 100 may output data of at least one group in which data collection has been completed in response to the user instruction.

In an example, when data of at least one of a plurality of groups in which data collection has been completed is changed after the data of at least one group in which data collection has been completed is printed, the image forming apparatus 100 may control the at least one group whose data is changed to be distinguished from other groups and displayed on a user interface screen.

FIG. 9 is a view of a user interface screen according to another example.

Referring to FIG. 9, as shown in a user interface screen 900, printed groups 910 may be distinguished from other groups and displayed. For example, icons of the printed groups 910 may be displayed in gray, unlike the colors of icons of other groups. In addition, shadows of the icons of the printed groups 910 may change over time, and the printed groups 910 may be removed from the user interface screen 900 when a predetermined time has elapsed after the printing.

As described above with reference to FIG. 8A, the processor 120 of the image forming apparatus 100 may determine that a predetermined condition is satisfied when data collection of a predetermined number or more of groups is completed. In response to the predetermined condition being satisfied, the processor 120 of the image forming apparatus 100 may generate a print command. When a predetermined time has elapsed after data of the predetermined number or more of groups has been printed, the processor 120 of the image forming apparatus 100 may control the data of the predetermined number or more of groups to be deleted from the memory 140.

As described above in FIG. 8B, when the user interface 110 obtains a user input from a user to print data of at least one group in which data collection has been completed, the processor 120 may determine that a predetermined condition is satisfied. In response to the predetermined condition being satisfied, the processor 120 of the image forming apparatus 100 may generate a print command. When a predetermined time has elapsed after data of at least one group in which data collection has been completed is printed, the processor 120 of the image forming apparatus 100 may control the data of at least one group in which data collection has been completed to be deleted from the memory 140.

FIG. 10 is a view of a process of searching for groups in an image forming apparatus according to an example.

Referring to FIG. 10, when a user inputs a specific keyword to the user interface 110, the image forming apparatus 100 may search for a group name including the keyword input by the user.

In an example, a user may set search conditions via the user interface 110. The search conditions may include a status and a timeline. The status may include, for example, whether to print, whether or not data collection has been completed, and whether or not a correction has been made, but is not limited thereto. The timeline may include, for example, whether a group is created today, yesterday, or within a week from today, but is not limited thereto.

For example, as shown in a user interface screen 1000 of FIG. 10, when a user inputs a keyword "seo" into the user interface 110 and a search condition is set to "Status: printed group (printed)" and "Timeline: group generated yesterday (yesterday)," the image forming apparatus 100 may detect groups that have been generated and printed yesterday with group names including a keyword "seo."

The above-described method may be realized by a general-purpose digital computer and may be formed into a program that may be executed by a computer, and which operates the program using a computer-readable recording medium. Such a computer readable recording medium may be a read only memory (ROM), a random access memory (RAM), a flash memory, CD-ROMs, CD-Rs, CD+Rs, CD-ROMs, DVD-Rs, DVD+Rs, DVD-RWs, DVD+RWs, DVD-RAMs, BD-ROMs, BD-Rs, BD-R LTHs, BD-REs, magnetic tape, floppy disks, solid-stated disk (SSD), and any device capable of storing instructions or software, associated data, data files, and data structures, and providing instructions or software, associated data, and data files to a processor or a computer so as to enable the processor or the computer to execute instructions.

While various examples have been described with reference to the figures, it will be understood by those of ordinary skill in the art that various changes in form and details may be made therein without departing from the spirit and scope as defined by the following claims.

The invention claimed is:

1. An image forming apparatus comprising:
a communication interface to obtain data from a plurality of external apparatuses;
a processor to:
in response to the obtaining, collect the obtained data according to a plurality of groups sorted based on identification information included in the obtained data, and
generate a print command when a predetermined condition is satisfied;
a user interface to display a plurality of icons respectively representing the plurality of groups on a user interface screen; and
an image forming job performer to print collected data according to the generated print command,
wherein the user interface is further to display the plurality of icons corresponding to a respective status of the plurality of groups.

2. The image forming apparatus of claim 1, wherein the processor generates the print command when data collection of a group is completed.

3. The image forming apparatus of claim 2,
wherein the processor generates an index page of the group in which the data collection has been completed, and
wherein the image forming job performer prints the index page.

4. The image forming apparatus of claim 2, wherein the processor, when data of one group is changed after data of the one group has been printed, controls the user interface to display the icon of the one group whose data is changed to be distinguished from the icons of the other groups and displayed on the user interface screen.

5. The image forming apparatus of claim 2, further comprising a memory,
wherein the processor, when a predetermined time has elapsed after data of the group has been printed, controls the data of the group to be deleted from the memory.

6. The image forming apparatus of claim 1,
wherein the user interface obtains a user input to print data of a group in which the data collection has been completed, and
wherein the processor generates the print command according to the user input.

7. The image forming apparatus of claim 6, further comprising a memory,
wherein the processor, when a predetermined time has elapsed after the data of the group in which the data collection has been completed is printed, controls the data of the group in which the data collection has been completed to be deleted from the memory.

8. The image forming apparatus of claim 1, wherein the processor, in response to the user interface obtaining a selection of an icon of a group from a user, controls the selected icon of the group to be distinguished from the icons of the other groups and displayed on the user interface screen.

9. The image forming apparatus of claim 1, wherein the processor receives an indication from one of the plurality of external apparatuses that data from the one of the plurality of external apparatuses has been obtained and generates the print command for the data obtained from the one of the plurality of external apparatuses in response to the received indication.

10. The image forming apparatus of claim 1, wherein the status indicates that the data for one of the plurality of groups has not been obtained.

11. The image forming apparatus of claim 1, wherein the status indicates that additional data for one of the plurality of groups has been obtained after the print command is generated.

12. A non-transitory computer-readable recording medium having recorded thereon instructions for executing a method, the non-transitory computer-readable recording medium comprising:
instructions for obtaining data from a plurality of external apparatuses;
instructions for, in response to the obtaining, collecting the obtained data according to a plurality of groups sorted based on identification information included in the obtained data;
instructions for displaying a plurality of icons respectively representing the plurality of groups on a user interface screen; and
instructions for printing collected data when a predetermined condition is satisfied,
wherein the instructions for displaying the plurality of icons further include instructions for displaying the plurality of icons corresponding to a respective status of the plurality of groups.

13. The non-transitory computer-readable recording medium of claim 12,
wherein the instructions for the collecting of the obtained data comprise instructions for completing data collection of a group, and
wherein the instructions for the printing of the collected data comprise instructions for printing data of the group when the data collection of the group is completed.

14. The non-transitory computer-readable recording medium of claim 12, further comprising:
instructions for obtaining a user input to print data of a group in which the data collection has been completed,
wherein the instructions for the printing of the collected data comprise instructions for printing data of the group in which the data collection has been completed when obtaining the user input.

15. A method comprising:
obtaining data from a plurality of external apparatuses;
in response to the obtaining, collecting the obtained data according to a plurality of groups sorted based on identification information included in the obtained data;
displaying a plurality of icons respectively representing the plurality of groups on a user interface screen; and
printing collected data when a predetermined condition is satisfied,
wherein the displaying of the plurality of icons respectively representing the plurality of groups includes displaying of the plurality of icons corresponding to a respective status of the plurality of groups.

16. The method of claim 15,
wherein the collecting of the obtained data comprises completing data collection of a group, and
wherein the printing of the collected data comprises printing data of the group when the data collection of the group is completed.

* * * * *